Figure 1:
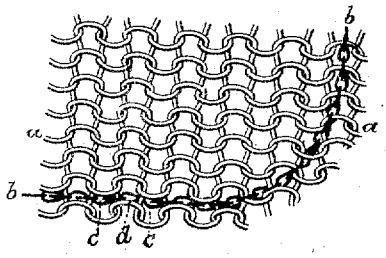

BEST AVAILABLE COPY

S. BORTON & C. H. WILLCOX.
Assignors to the WILLCOX & GIBBS SEWING MACHINE COMPANY.

ART OF MANUFACTURING HOSIERY.

No. 10,730. Reissued June 1, 1886.

Witnesses
William F. Davis
Harry Smith

Inventors
Stockton Borton
and
Charles H. Willcox
by their Attorneys
Howson & Sons

UNITED STATES PATENT OFFICE.

STOCKTON BORTON, OF PHILADELPHIA, PENNSYLVANIA, AND CHARLES H. WILLCOX, OF NEW YORK, N. Y., ASSIGNORS TO THE WILLCOX & GIBBS SEWING MACHINE COMPANY, OF NEW YORK, N. Y.

ART OF MANUFACTURING HOSIERY.

SPECIFICATION forming part of Reissued Letters Patent No. 10,730, dated June 1, 1886.

Original No. 255,579, dated March 28, 1882. Application for reissue filed November 25, 1885. Serial No. 183,999.

*To all whom it may concern:*

Be it known that we, STOCKTON BORTON, of Philadelphia, in the State of Pennsylvania, and CHARLES HENRY WILLCOX, of the city, county, and State of New York, and both citizens of the United States, have invented a new and useful Improvement in the Art of Manufacturing Hosiery, which improvement is fully set forth in the following specification.

In the manufacture of hosiery the plan pursued with the best quality of goods has been to knit the several parts with selvage edges and unite them by an overseam, and it has been proposed to make the overseam of straight-ahead stitches equal in number, or approximately equal, to the "gage" of the fabric, using that phrase in the sense in which it is employed by those skilled in the art of knitting—that is, as expressing the number of loops formed within a certain space crosswise and at the selvage edge of the fabric and equal to the number of needles employed in knitting the goods, in which case the sewing-stitches are equal in length to the distance from *c* to *c*, as shown in the drawings. The expenditure of time and labor involved in this plan of knitting the goods with selvage edges and uniting them by an overseam has been avoided in the manufacture of goods of an inferior quality, commonly known as "cut hose," by cutting the pieces from a sheet of knit material and stitching them together on a sewing-machine ordinarily with a chain-stitch machine.

Heretofore where the seams of cut hose have been formed of straight-ahead stitches these stitches have been made very long and rather loose—say about seven to the inch—and have been formed at a considerable distance from the cut edges, partly because it is impracticable to sew very close to the raw edges of knit goods, but also and mainly to make a strong seam not liable to be destroyed by raveling at the edges of the fabric. The margin thus left outside the seam is objectionable and detracts from the value of the goods.

To produce cut hose of a superior quality the pieces have been united by an overseam on a button-hole machine or on a machine making a zigzag lock-stitch, one stitch within the fabric and the next beyond the edge thereof. The pieces have also been united by means of a zigzag stitch entirely within the fabric, the edges being trimmed or cleared close to the outer row of stitches by a shearing attachment operating simultaneously with the sewing mechanism, so as to trim the fabric as it is advanced by the feed of the machine. These button-hole and zigzag forms of stitch have been employed in order to prevent raveling, and also to enable a firm and closely trimmed seam to be produced; but the mechanism for forming these stitches is necessarily slower in operation than that for forming a straight-ahead seam, and in the finished article the stitching must be at a distance from the edge equal to or greater than the lateral movement of the fabric or of the needle in sewing, and there is consequently an appreciable ridge or welt.

Our invention relates to the manufacture of that class of knit-goods known as cut hosiery, and the object of our improvement is to allow of forming the seams with straight-ahead stitches, and at the same time to allow of the trimming of the seams nearer to the line of stitches than has heretofore been practicable in the manufacture of cut hose seamed with such stitches, thereby obtaining a product practically free from the objectionable ridges or welts heretofore characteristic of cut hose seamed with straight-ahead stitches, together with the advantages of greater rapidity of production and consequent economy than is possible where the seams are formed of button-hole or zigzag stitches.

In carrying out our invention a straight-ahead seam, preferably with chain-stitch, which can be run with the greatest rapidity, is made, said seam consisting, however, not of the long loose stitches heretofore employed in making this class of goods, but of stitches tight or well drawn up and short, about equal in length to the gage of the fabric, using that phrase, not in the ordinary sense of knitters' gage, but as expressing a length equal to the distance from center to center of adjoining spaces inclosed by the threads of the fabric, at any part thereof inside of the edge row of loops, this gage being practically about one-half the length of the knitters' gage of the fabric, or from the point *c* to the point *d*, shown in the drawings. As the pieces are being thus sewed together, the edges of the fabric are simultaneously mechanically trimmed or cleared close to and parallel with the line of seam by means of an attachment to the sewing-machine. Cut knit-goods thus manufactured are superior in appearance and equal or superior in durability to those having the cut edges united by an overseam, or to the machine-cleared goods sewed with a zigzag stitch, and are approximately equal to the so-called "regular-made" goods with selvage edges. The sewing-stitches being about equal in length to the distance from center to center of adjoining spaces inclosed by the threads of the fabric at any part thereof inside of the edge row of loops, inclose only a few threads—say one or two corresponding threads on each of the two edges to be united—and being tighter than is possible with a longer stitch, they hold the threads firmly, so that a margin is not necessary to secure the permanence of the seam. The edges of the fabric can therefore be trimmed as closely as possible to the seam, since, so long as the stitches are not cut, the strength of the seam is not seriously impaired.

It is not necessary that the stitches should be exactly the gage of the fabric, using the term "gage" as indicating the distance from center to center of adjoining spaces inclosed by the threads of the fabric at any part thereof inside of the edge row of loops.

The seam may be made with the lock or other suitable form of stitch; but the chain-stitch is preferred, because it is elastic, and is similar in its nature to the goods themselves, and because the loops surround the knit threads after the fashion of a running noose and thus bind them very tightly, and because the strength and regularity of the seam itself are less affected than are those of a lock-stitch seam by the formation of stitches in the interstices of the fabric without the interposition of the knit threads. The edges being closely trimmed, the article produced is not substantially thicker at the seam than elsewhere, and is practically free from the objectionable ridge or welt of the ordinary cut hose seamed with straight-ahead stitches.

The character of the seam, due to its being straight ahead and to the use of stitches about equal in length to the distance from center to center of adjoining spaces inclosed by the threads of the fabric at any part thereof inside of the edge row of loops and to the regular and close trimming of the edges, gives to the improved machine-cleared hosiery produced by the practice of our invention an appearance very different from and a quality very superior to those of knit goods of the class heretofore produced.

Figure 2:
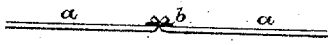

The accompanying drawings, which form part of this specification, illustrate the seam made in accordance with this invention, Figure 1 being a side view, and Fig. 2 a cross-section In Fig. 1 the fabric is shown enlarged, and the threads are represented by plain lines in order that they may be clearly distinguished. A chain-stitch seam is shown. The knit fabric is represented by *a* and the seam by *b*.

In manufacturing the improved hosiery the well-known Willcox & Gibbs sewing machine, which uses a single thread and makes a chain-stitch by means of a revolving hook or looper, is employed, and, preferably, the automatic machine provided with an automatic or intermittent tension; but any of the ordinary forms of lock-stitch machines which complete each stitch independently can be used.

A shearing attachment or trimmer of any suitable construction can be used to clear or trim the edges of the goods; but the trimmer described in our Letters Patent No. 255,578, dated March 28, 1882, is considered the best adapted to the purpose.

The size of the thread and needles will of course be adapted to the particular character of the fabric to be sewed, as is well understood by operators skilled in using the Willcox & Gibbs machine, and the feed and other parts of the machine requiring adjustment will also be regulated according to the circumstances of the case.

The invention is not limited to hosiery proper—that is, stockings or socks—but includes shirts, drawers, and other articles of wearing apparel and knit goods generally.

By a "straight-ahead seam" as used in this specification is to be understood a seam, whether curvilinear or straight, formed by a series of stitches following each other in substantially the same direction in contradistinction to a seam in which the stitches alternately deviate from the general direction of the seam and make what is known as a "zigzag stitch."

We claim as our invention and desire to secure by Letters Patent—

The improvement in the art of manufacturing cut hosiery, consisting in sewing the seam or seams with straight-ahead stitches equal or approximately equal in length to the gage of the fabric—*i. e.*, the distance from center to center of adjoining spaces inclosed by the threads of the fabric at any point inside the edge row of loops—and trimming the edges of the fabric parallel with the line of seam, substantially as herein described.

In testimony whereof we have signed our names to this specification in the presence of two subscribing witnesses.

STOCKTON BORTON.
CHAS. H. WILLCOX.

Witnesses:
GILMAN E. JOPP,
HENRY B. ROSE.